Nov. 26, 1968 L. M. SUMMERFIELD 3,412,447
MOUNTING CARBON INSERTS IN A METAL BODY
Filed April 14, 1966 2 Sheets-Sheet 2

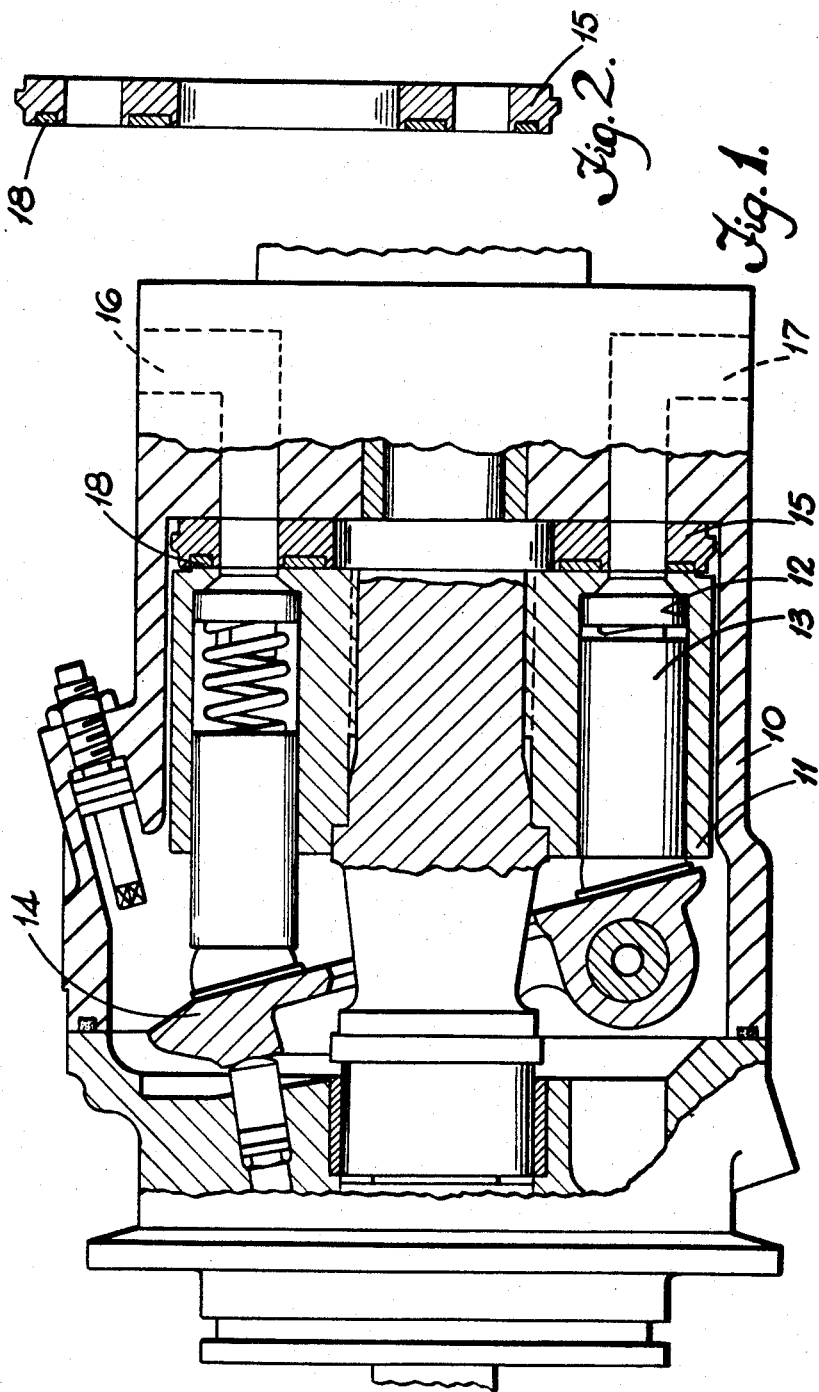

�# United States Patent Office 3,412,447
Patented Nov. 26, 1968

3,412,447
MOUNTING CARBON INSERTS IN A METAL BODY
Lionel Measures Summerfield, Hadley, Coed-y-Paen, Wales, assignor to Joseph Lucas (Industries) Limited, Birmingham, England
Filed Apr. 14, 1966, Ser. No. 542,528
2 Claims. (Cl. 29—149.5)

ABSTRACT OF THE DISCLOSURE

In a method of mounting a carbon insert in a metal body, the carbon insert is first accurately formed and is then used as an electrode in a spark erosion process to form a recess of the shape corresponding to the shape of the carbon insert and into which the insert is fitted.

The object of this invention is to provide an improved method of mounting a carbon insert (e.g. a bearing) in a recess in the surface of a metal body.

A method according to the invention comprises first accurately forming the carbon insert, and then using it as an electrode for forming the recess in the body by a spark erosion process, whereby a recess of the appropriate shape to receive the insert will be formed in the body.

Figure 3:
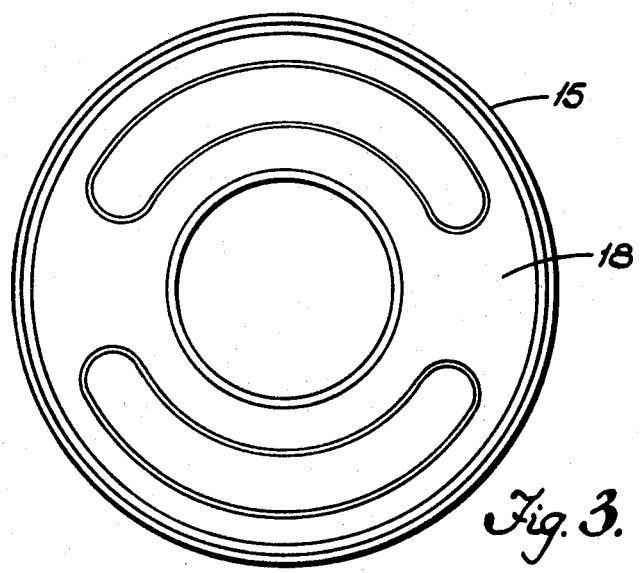
Figure 4:
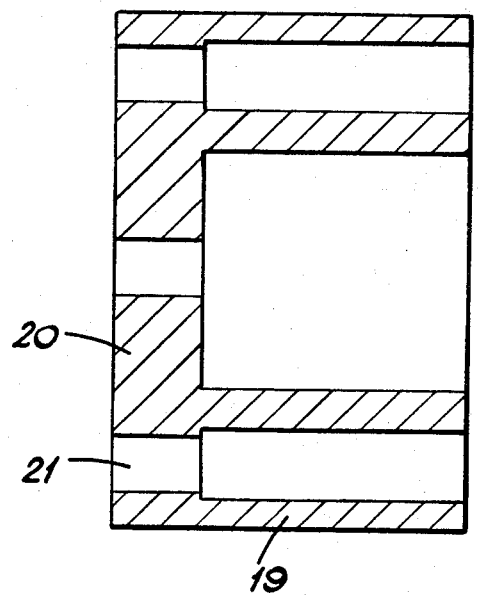

An example of the invention is illustrated in the accompanying drawings in which:

FIGURE 1 is a part cross-sectional view of a swashplate type pump or motor incorporating the invention, FIGURE 2 is a cross-sectional view of a port plate for use in the pump of FIGURE 1, FIGURE 3 is a plan view of the plate shown in FIGURE 2, and FIGURE 4 is a cross-sectional view of a carbon insert in an intermediate stage of manufacture.

Referring to FIGURE 1, the swash plate type pump or motor comprises a hollow body 10 containing a rotatable cylinder block 11 having a plurality of angularly spaced bores 12 accommodating respective spring loaded pistons 13 arranged to re-act upon an adjustable cam plate 14. Between the end of the cylinder block 11 remote from the cam plate 14 and the closed end of the body 10 is a stationary port block 15 having a pair of arcuate ports formed therein, one of which communicates with an inlet 16 and the other with an outlet 17 for liquid to be pumped.

The arrangement is such that as the cylinder block 11 rotates, the bores 12 communicate in turn with the inlet 16 and outlet 17 and the pistons 13 are appropriately reciprocated by contact with the cam plate 14.

In order to minimise friction between the cylinder block 11 and port block 15 it is required to mount in a recess in the presented face of the port block a carbon insert 18 which will serve as a rubbing face between the cylinder and port blocks, this insert being shaped to surround the ports, and certain other apertures in the port block, as seen in FIGURES 2 and 3.

In applying the invention to such a purpose, a block 19 of carbon is formed of the required cross-sectional shape but as seen in FIGURE 4 this block is approximately four times deeper than the carbon insert finally produced. This block 19 has a generally cylindrical end portion 20 in which are formed holes 21 for the escape of material as later described. This block 19 is used as an electrode in a spark erosion process, the other electrode being constituted by the port block which is initially formed with a flat surface into which the insert is to be fitted.

To carry out the method, the carbon block 19 is positioned accurately relatively to the port block and whilst immersed in a suitable electrolyte, which, for example may be a paraffin based electrolyte, a current is passed between the two electrodes, formed by the port block and carbon block respectively to form a shaped recess. Eroded material can escape through the holes 21. The voltage may be in the range of 20 to 60 volts and the current may range from zero to 30 amps and may be manually controlled as required.

When a recess of the required depth is formed in the port block, the carbon block is removed and a section forming the insert 18 is cut from this block of the exact length and this is then fitted into the recess and may be secured by a suitable adhesive.

The block 19 can then be used to form at least one further recess and insert, thus enabling one initial machining operation of the carbon block 19 to serve for the manufacture of several inserts.

To speed the process and make it more economical the port block 15 may have an undersized recess roughly formed therein while in the soft condition. The spark erosion process takes place after hardening thus avoiding possible distortion during a hardening process normally carried out after machining has been completed.

It will be understood that even though the insert is of complex shape, by using it as one of the electrodes, a recess of the exact shape to receive it will be ensured, and complicated machining operations are avoided.

Having thus described my invention what I claim as new and desire to secure by Letters Patent is:

1. A method of mounting a carbon insert of complex cross-sectional shape in a correspondingly shaped recess in the surface of a metal body comprises first accurately forming the carbon insert, and then using it as an electrode for forming the recess in the body by a spark erosion process, whereby a recess of a shape to receive the insert is formed in the body, and finally securing the insert in the recess in the body.

2. A method according to claim 1 in which the insert is formed from a block of carbon having a cross-sectional shape of the insert but being of greater depth than the insert, and after completion of the formation of the recess, the insert is cut off from the block and finally secured in the recess.

References Cited

UNITED STATES PATENTS

| | | | |
|---|---|---|---|
| 2,818,490 | 12/1957 | Dixon et al. | 219—69 |
| 3,120,601 | 2/1964 | Berlin et al. | 219—69 |
| 3,194,938 | 7/1965 | Smith | 219—69 |
| 3,240,914 | 3/1966 | Hill et al. | 219—69 |

FOREIGN PATENTS 716.871  8/1965  Canada.

WILLIAM L. FREEH, *Primary Examiner.*